US012041927B2

(12) United States Patent
Hall (10) Patent No.: US 12,041,927 B2
(45) Date of Patent: Jul. 23, 2024

(54) SYSTEMS, METHODS, AND APPARATUSES FOR PACKING AND TRANSPORTING MATERIALS SUITABLE FOR TAXIDERMY

(71) Applicant: Christopher Hall, Chico, CA (US)

(72) Inventor: Christopher Hall, Chico, CA (US)

( * ) Notice: Subject to any disclaimer, the term of this patent is extended or adjusted under 35 U.S.C. 154(b) by 0 days.

(21) Appl. No.: 17/229,834

(22) Filed: Apr. 13, 2021

(65) Prior Publication Data
US 2021/0321604 A1    Oct. 21, 2021

Related U.S. Application Data

(60) Provisional application No. 63/011,169, filed on Apr. 16, 2020.

(51) Int. Cl.
*A01M 31/00* (2006.01)
(52) U.S. Cl.
CPC ................... *A01M 31/006* (2013.01)
(58) Field of Classification Search
CPC .................................................. A01M 31/006
See application file for complete search history.

(56) References Cited

U.S. PATENT DOCUMENTS

| | | | | |
|---|---|---|---|---|
| 2,407,787 A * | 9/1946 | Kernahan | ................. | A45F 3/04 224/655 |
| 4,887,823 A * | 12/1989 | Hallett | ................. | A01M 31/00 224/921 |
| 6,510,705 B1 * | 1/2003 | Jackson | ............. | B65D 81/3813 62/457.2 |
| 6,536,639 B1 * | 3/2003 | Frank | ........................ | A45F 3/14 224/264 |
| 6,889,882 B1 * | 5/2005 | Leep | ........................ | A45F 3/14 224/160 |
| 8,381,956 B2 * | 2/2013 | Gleason, Jr. | ............ | A45F 3/047 224/645 |
| 8,562,213 B1 * | 10/2013 | McBee | .................. | A22B 7/008 383/7 |
| 9,090,394 B2 * | 7/2015 | Peisley | .................. | B65D 81/24 |
| 9,181,022 B2 * | 11/2015 | Armstrong | ............... | A45C 5/00 |
| 2009/0032562 A1 * | 2/2009 | Glass | ..................... | A45C 11/00 119/843 |
| 2022/0061308 A1 | 3/2022 | Surratt | | |

* cited by examiner

*Primary Examiner* — Derek J Battisti (57) ABSTRACT

The present set of embodiments relate to systems, methods, and apparatuses for packing and transporting materials suitable for taxidermy. More specifically, the present disclosure includes embodiments of animal cape and skull transportation apparatuses including a hood adjoined to a cape receiver wherein the hood is adapted to receive the muzzle of an animal and cape receiver is adapted to receive an animal cape including hide harvested from near the shoulder region of the animal. Additional embodiments allow for the apparatus to partially enclose the cape and skull of an animal to preserve between initial harvest and a taxidermy professional.

12 Claims, 10 Drawing Sheets

SYSTEMS, METHODS, AND APPARATUSES FOR PACKING AND TRANSPORTING MATERIALS SUITABLE FOR TAXIDERMY

FIELD

The present disclosure generally relates packing and transporting of materials suitable for taxidermy. More specifically, packing and transporting the hide and head of a big game animal for future taxidermy purposes.

BACKGROUND

Taxidermy has been integral to the sport of big game hunting where the subject of the hunt often serves as the trophy. A high-quality taxidermy relies on high quality starting materials. One component of obtaining high quality starting materials involves proper transportation of the starting materials to prevent damage. In the case of big game head mounts, proper transportation of the skull and cape is essential in achieving a high-quality taxidermy.

Historically, hunters came up with ad hoc ways of transporting the cape and skull. One commonly used method involves using some combination of tape, rope, bungee cables, and other general use securing devices to secure the cape of the animal to its skull.

What is needed in the field of hunting and taxidermy is a system and method specifically designed to prevent damage to the cape and skull of big game animals in order to maximize the chances of producing a high quality taxidermy through use of high quality starting materials.

SUMMARY

In one aspect, an apparatus for packing and transporting a game animal cape and skull is disclosed. The apparatus may include a hood having an outwardly facing exterior surface connected to an interior surface at a perimeter opening, wherein the interior surface surrounds a cavity. The apparatus may include a cape receiver joined along the perimeter opening of the hood and includes a flexible sheet extending away from the cavity. In various embodiments, the hood may include three spaced apart connectors. In various embodiments, the apparatus may include a strap, wherein each of the spaced apart connectors is affixed to a first end of the strap and the hood is joined to a second end of the strap. In various embodiments, the hood may further include a thin material, comprising an enclosed interior surface forming a passageway and an exterior surface joined to an opening perimeter of the hood. In various embodiments, the apparatus may further include a cord occupying the passage way, wherein the cord has a first end extending out of a first passageway opening and a second end extending out of a second passageway opening, wherein the passageway openings are formed along the opening perimeter. In various embodiments, a cord lock may secure the first and second ends of the cord. In various embodiments, the exterior surface of the hood may be water resistant. In various embodiments, the cavity may be substantially muzzle shaped. In various embodiments, the cape receiver may join the hood as a unitary piece of piece of material. In various embodiments, the cape receiver and hood may be sewn or glued together. In various embodiments, the cape receiver may be made from a thin material and includes a perimeter, comprising a proximal edge having a first end and a second end, a first side edge having a first end and a second end, wherein the second end of the proximal edge connects to the second end of the first side edge, a first concave edge having a first end and a second end, wherein the second end of the first side edge connects to the second end of the first concave edge, a distal edge having a first end and a second end, wherein the first end of the first concave edge connects to the first end of the distal edge, a second concave edge having a first end and a second end, wherein the second end of the distal edge connects to the second end of the second concave edge, and a second side edge having a first end and a second end, wherein the first end of the second side edge connects to the first end of the second concave edge, wherein the second end of the second side edge connects to the second end of the proximal edge. In various embodiments, the proximal edge and distal edge may be substantially parallel, wherein the concave edges are substantially the same size and mirror one another, wherein the distance between the second end of the first side edge and first end of the second side edge are further apart than the first end of the first side edge and the second end of the second side edge. In various embodiments, the cape receiver may further include three corresponding connectors and the three connectors removably attach to the three corresponding connectors. In various embodiments, the connectors may be marked so the user can identify the pairing connectors. In various embodiments, the connectors may be marked using a color-coding system. In various embodiments, the cape receiver may be made from an elastic material. In various embodiments, the apparatus may further include a mount affixed to the flexible sheet. In various embodiments, the flexible sheet may be shaped as a mirrored duplication along a centerline.

In one aspect, an apparatus for packing and transporting a game animal cape and skull is disclosed. The apparatus may include a hood having an outwardly facing exterior surface connected to an interior surface at a perimeter opening, wherein the interior surface surrounds a cavity and a plurality of spaced apart connectors are affixed to the exterior surface and a cape receiver joined along the perimeter opening of the hood and including a flexible sheet extending away from the cavity, wherein a plurality of corresponding connectors are affixed to the flexible sheet and each of the corresponding connectors pairs to one of the spaced apart connectors.

In one aspect, an apparatus for packing and transporting a game animal cape and skull is disclosed. The apparatus may include a hood having an outwardly facing exterior surface connected to an interior surface at a perimeter opening, wherein the interior surface surrounds a cavity and a cape receiver joined to a portion the perimeter opening of the hood and including a flexible sheet extending away from the cavity, wherein the cape receiver includes a flexible sheet made from a thin material and the flexible sheet includes a perimeter, comprising a proximal edge having a first end and a second end, a first side edge having a first end and a second end, wherein the second end of the proximal edge connects to the second end of the first side edge, a first concave edge having a first end and a second end, wherein the second end of the first side edge connects to the second end of the first concave edge, a distal edge having a first end and a second end, wherein the first end of the first concave edge connects to the first end of the distal edge, a second concave edge having a first end and a second end, wherein the second end of the distal edge connects to the second end of the second concave edge and a second side edge having a first end and a second end, wherein the first end of the second side edge connects to the first end of the second concave edge, wherein the second end of the second side edge connects to the second end of the proximal edge, wherein the proximal edge and distal edge are substantially parallel, the concave edges are substantially the same size and mirror one another, and the distance between the second end of the first side edge and first end of the second side edge are further apart than the first end of the first side edge and the second end of the second side edge.

In one aspect, a method of using a game animal cape and skull transportation system is disclosed. The method may include positioning a muzzle of an animal into a cavity of a hood, positioning a cape of the animal adjacent to a skull of the animal and securing a cape receiver to the hood in a position that restricts movement of the cape and the skull relative to one another. In various embodiments, the method may further include the step of positioning animal horns or antlers adjacent to a first and a second side edges. In various embodiments, the step of securing the cape receiver to the hood causes the side edges of the cape receiver to come into physical contact with the horns or antlers. In various embodiments, the method may further include the steps of loosening a cord to widen an opening leading to the cavity within the hood and removing the cape receiver from the cavity. In various embodiments, the hood may include a thin material including an enclosed interior surface forming a passageway and an exterior surface joined to an opening perimeter of the hood, wherein the cord occupies the passageway. In various embodiments, the method may further include the step of attaching the transportation system to a carrying device. In various embodiments, the step of securing may further include the steps of matching a plurality of color-coded connectors affixed to the hood to a corresponding set of connectors affixed to the cape receiver and securing the connectors to the matched corresponding connectors. In various embodiments, the hood may include an outwardly facing exterior surface joined to an interior surface at a perimeter opening, wherein the interior surface surrounds the cavity. In various embodiments, the cape receiver may include a flexible sheet material that is joined along the perimeter opening. In various embodiments, the step of securing may further include tightening a strap.

In one aspect, a method of using a game animal cape and skull transportation system is disclosed. In various embodiments, the method may include the steps of positioning a muzzle of an animal within a cavity of a hood, positioning a pair of horns or antlers of the animal adjacent to a first and a second side edge of a cape receiver, positioning a cape of the animal adjacent to a skull of the animal, positioning the cape receiver adjacent to the hood, matching a plurality of color-coded connectors affixed to the hood to a corresponding set of connectors affixed to the cape receiver, and securing the connectors to the matched corresponding connectors in an arrangement that restricts movement of the cape and the skull relative to one another.

In one aspect, a method of using an animal cape and skull transportation system is disclosed. The method may include the steps of loosening a cord to widen an opening, wherein the opening leads to a cavity within a hood, removing and unfurrowing a cape receiver from the cavity, positioning a muzzle of an animal into the cavity of the hood, positioning a cape of the animal adjacent to a skull of the animal, positioning the cape receiver adjacent to the hood and in physical communication with the cape and skull, affixing the cape receiver to the hood using connectors in an arrangement that restricts movement of the cape and the skull relative to one another and attaching the transportation system to a carrying device. In various embodiments, the method may include the step of positioning the cape receiver adjacent to the hood and in physical communication with the cape and skull includes wrapping the cape receiver around the cape. In various embodiments, the connectors include Velcro.

BRIEF DESCRIPTION OF THE SEVERAL VIEWS OF THE DRAWINGS

For a more complete understanding of the principles disclosed herein, and the advantages thereof, reference is now made to the following descriptions taken in conjunction with the accompanying drawings in which.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

Furthermore, in describing various embodiments, the specification may present a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one of skill in the art can readily appreciate that the sequences may be varied and still remain within the spirit and scope of the various embodiments.

DETAILED DESCRIPTION OF THE EMBODIMENTS

Embodiments of systems, methods, and apparatuses for packing and transporting materials suitable for taxidermy are described in the accompanying description and figures.

In the figures, numerous specific details are set forth to provide a thorough understanding of certain embodiments. A skilled artisan will be able to appreciate that the packing and transportation system described herein can be used in a variety of ways and circumstances, not limited, to what is specifically detailed. Additionally, the skilled artisan will appreciate that certain embodiments may be practiced without these specific details. Furthermore, one skilled in the art can readily appreciate that the specific sequences in which methods are presented and performed are illustrative and it is contemplated that the sequences can be varied and still remain within the spirit and scope of certain embodiments.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

Figure 1:
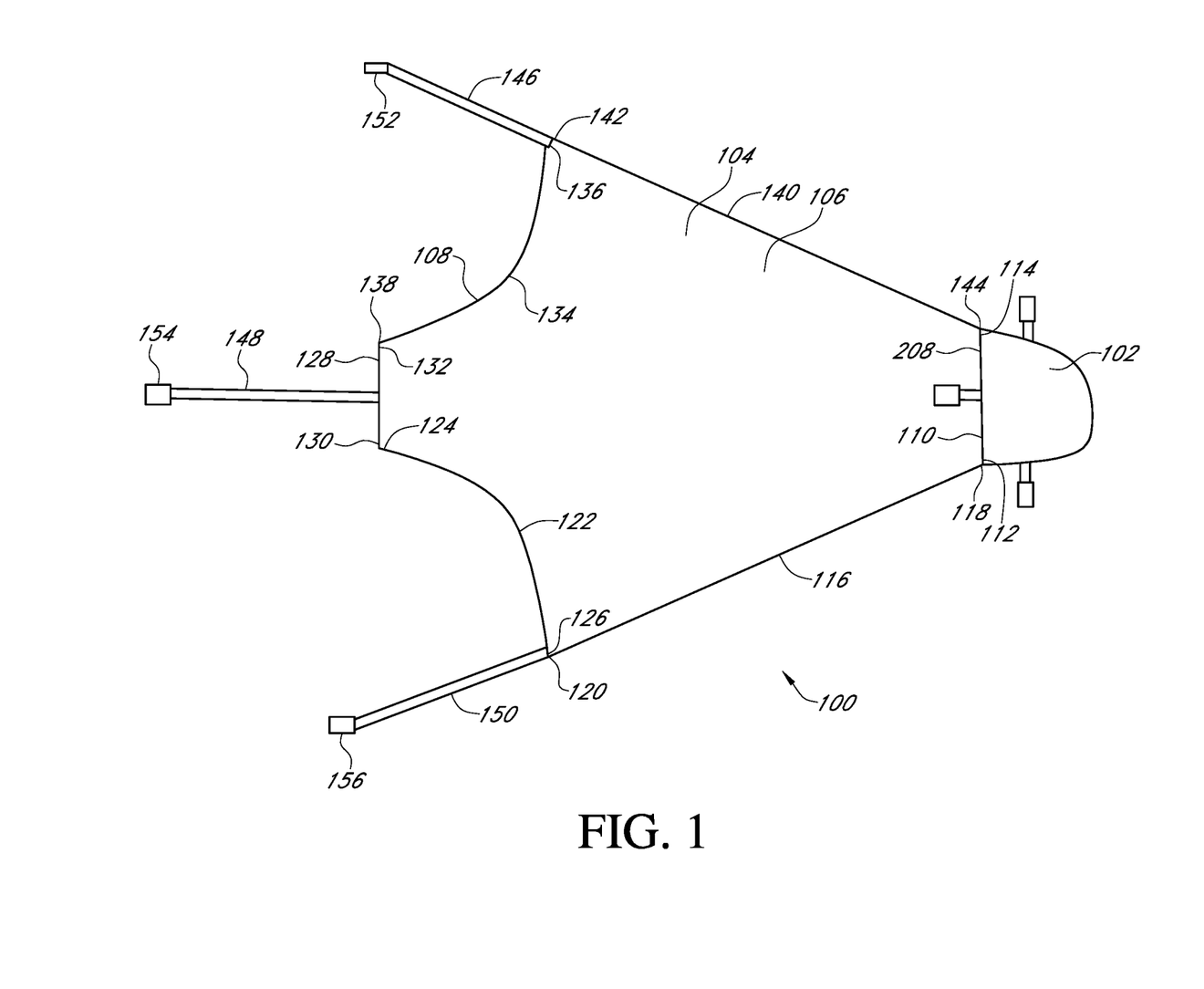
FIG. 1 is an illustration of a big game cape and skull transportation system according to one of various embodiments.

Referring to FIG. 1, a depiction of a cape or hide and skull transportation system 100 is shown according to an embodiment. In various embodiments, the cape and skull transportation system 100 may include a hood 102 attached to a cape receiver 104 the cape receiver may include a flexible sheet 106. In various embodiments, the hood 102 and cape receiver 104 may be a single piece of material. In various embodiments, the hood 102 and cape receiver 104 may include two separate parts that are joined together. In some embodiments, the hood 102 and cape receiver 104 may include two pieces of fabric that are sewn or glued together. In some embodiments, the flexible sheet 104 may include an elastic material designed to stretch and encompass the cape and skull of big game animals. In some embodiments, the elastic material may include spandex.

Figure 7:
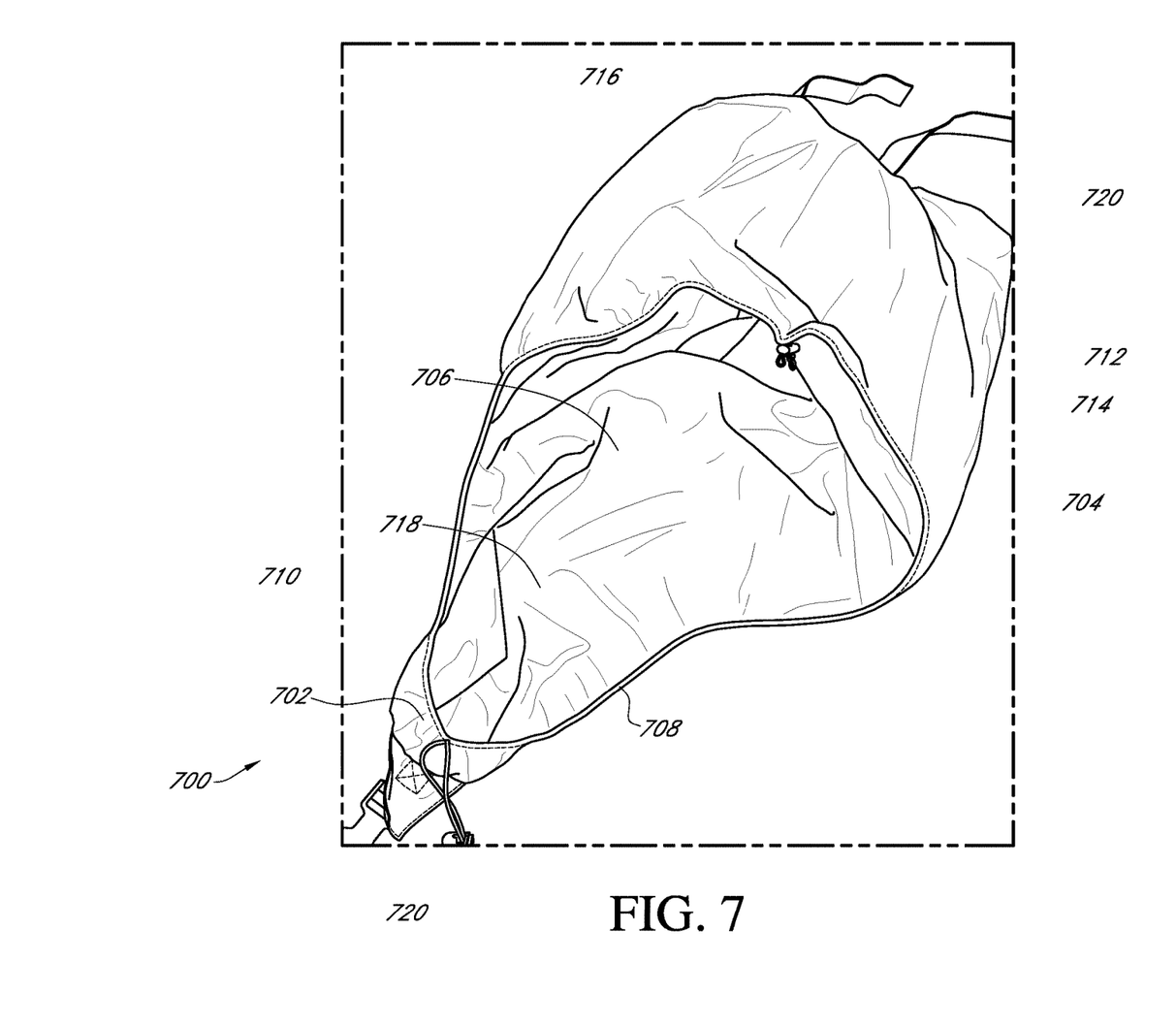
FIG. 7 an illustration of a big game cape and skull transportation system according to one of various embodiments.

Referring to FIG. 7, a depiction of a cape or hide and skull transportation system 700 is shown according to an embodiment. The cape or hide and skill transportation system 700 may include various analogous parts to the cape or hide and skull transportation system 100 depicted in FIG. 1. In various embodiments, a single perimeter 708 may surround an opening 710 leading to a hood 702 and a cape receiver 704. In various embodiments, In various embodiments, the flexible sheet 106 706 may be shaped to wrap in a specified way around the cape and skull of a big game animal. In various embodiments, the flexible sheet 106 706 may be made from a thin material and include a perimeter 108 having a proximal edge 110 having a first end 112 and a second end 114 and a first side edge 116 having a first end 118 and a second end 120, wherein the second end 112 of the proximal edge 110 connects to the second end 118 of the first side edge 116 and a first concave edge 122 having a first end 124 and a second end 126, wherein the second end 120 of the first side edge 116 is connected to the second end 126 of the first concave edge 122 and a distal edge 128 having a first end 130 and a second end 132, wherein the first end 124 of the first concave edge 122 connects to the first end 130 of the distal edge 128 and a second concave edge 134 having a first end 136 and a second end 138, wherein the second end 132 of the distal edge 128 connects to the second end 138 of the second concave edge 134 and a second side edge 140 having a first end 142 and a second end 144, wherein the first end 142 of the second side edge 140 connects to the first end 136 of the second concave edge 134, wherein the second end 144 of the second side edge 140 connects to the second end 114 of the proximal edge 110. In some embodiments, the connections may represent angular shape changes in the flexible sheet 106. In some embodiments, the connections may be joined pieces of fabric. In various embodiments, the perimeter 108 may include a protective coating. In some embodiments, the protective coating may be threading.

In various embodiments, the proximal edge 110 and distal edge 128 may be substantially parallel. In various embodiments, the concave edges 122, 134 may be substantially the same size and may mirror one another. In various embodiments, the distance between the second end 120 of the first side edge 116 and first end 142 of the second side edge 140 may be further apart than the first end 118 of the first side edge 116 and the second end 144 of the second side edge 140. In some embodiments, the flexible sheet 106 may be shaped as a mirrored duplication along a centerline 146. In various embodiments, two pieces of fabric may be joined along the centerline 146 and combine to complete a cape receiver 104.

Figure 2:
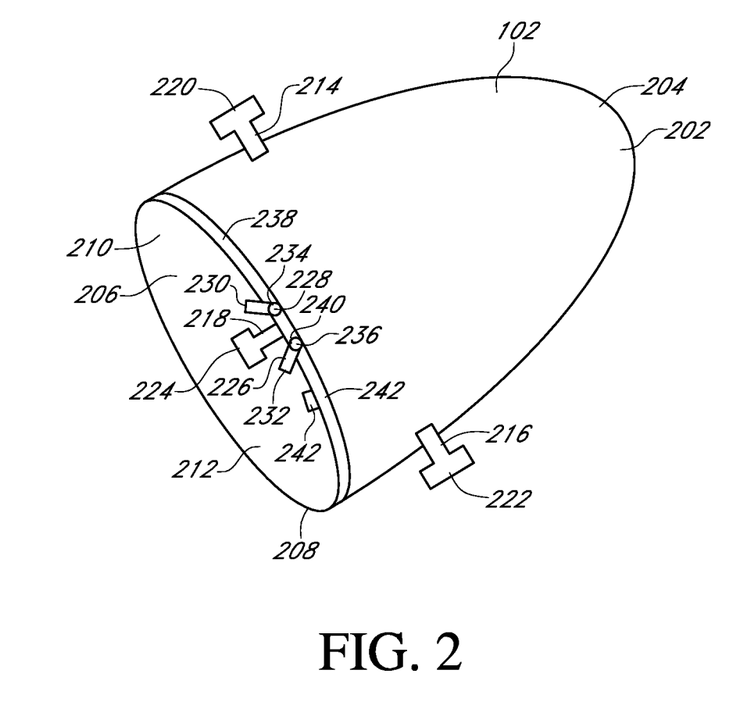
FIG. 2 is an illustration of a hood for a big game cape and skull transportation system according to one of various embodiments.

In various embodiments, three spaced apart corresponding connectors 152, 154, 156 may be joined to the cape receiver and designed to operably interact with a set of connectors 220, 222, 224 on the hood 102. In various embodiments, the connectors 152, 154, 156, 220, 222, 224 may be buckles, hooks, Velcro, or any connection device having a neutral gender or genders. In various embodiments, the corresponding connectors 152, 154, 156 may be joined to the flexible sheet 104 with straps 146, 148, 150. In some embodiments, a strap 148 and connector 154 extend away from the distal edge 128. In some embodiments, straps 146, 150 and connectors 152, 156 extend away from at or near the corners where the concave edges 122, 134 meet the side edges 116, 140.

Figure 8:
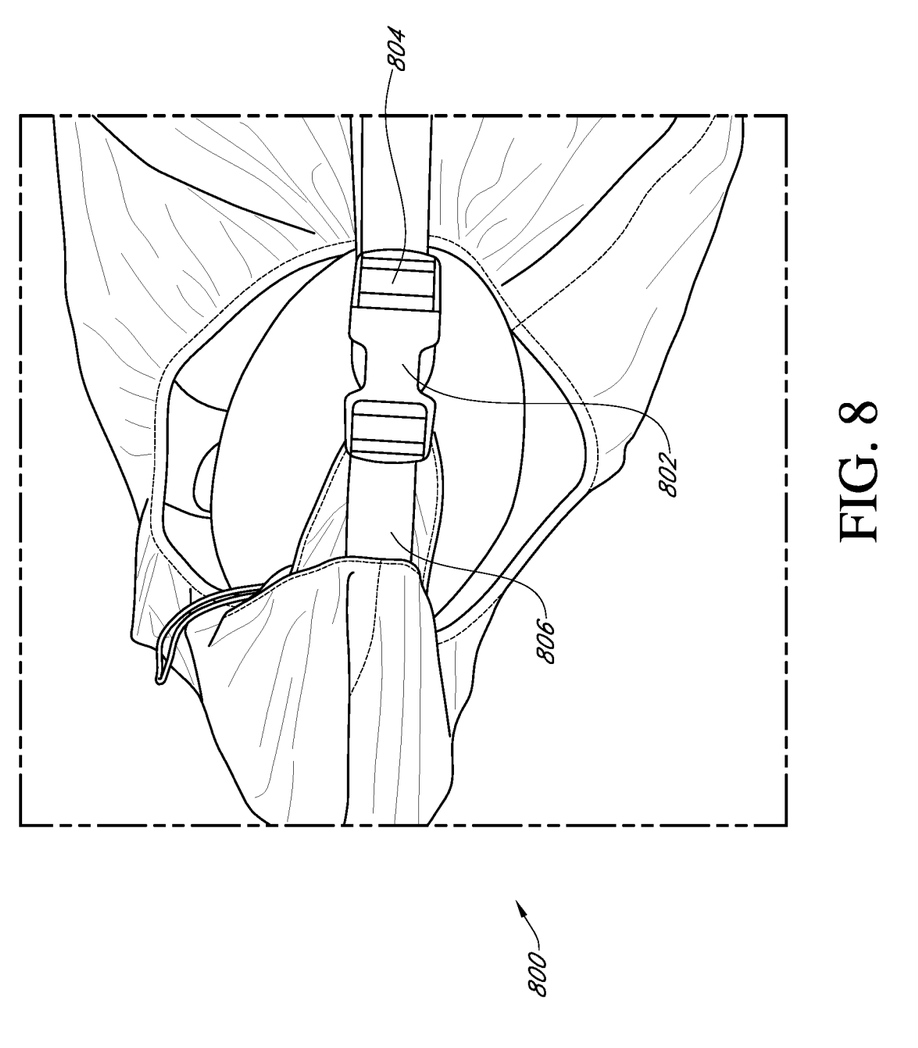
FIG. 8 is an illustration of a hood for a big game cape and skull transportation system according to one of various embodiments.
Figure 9:
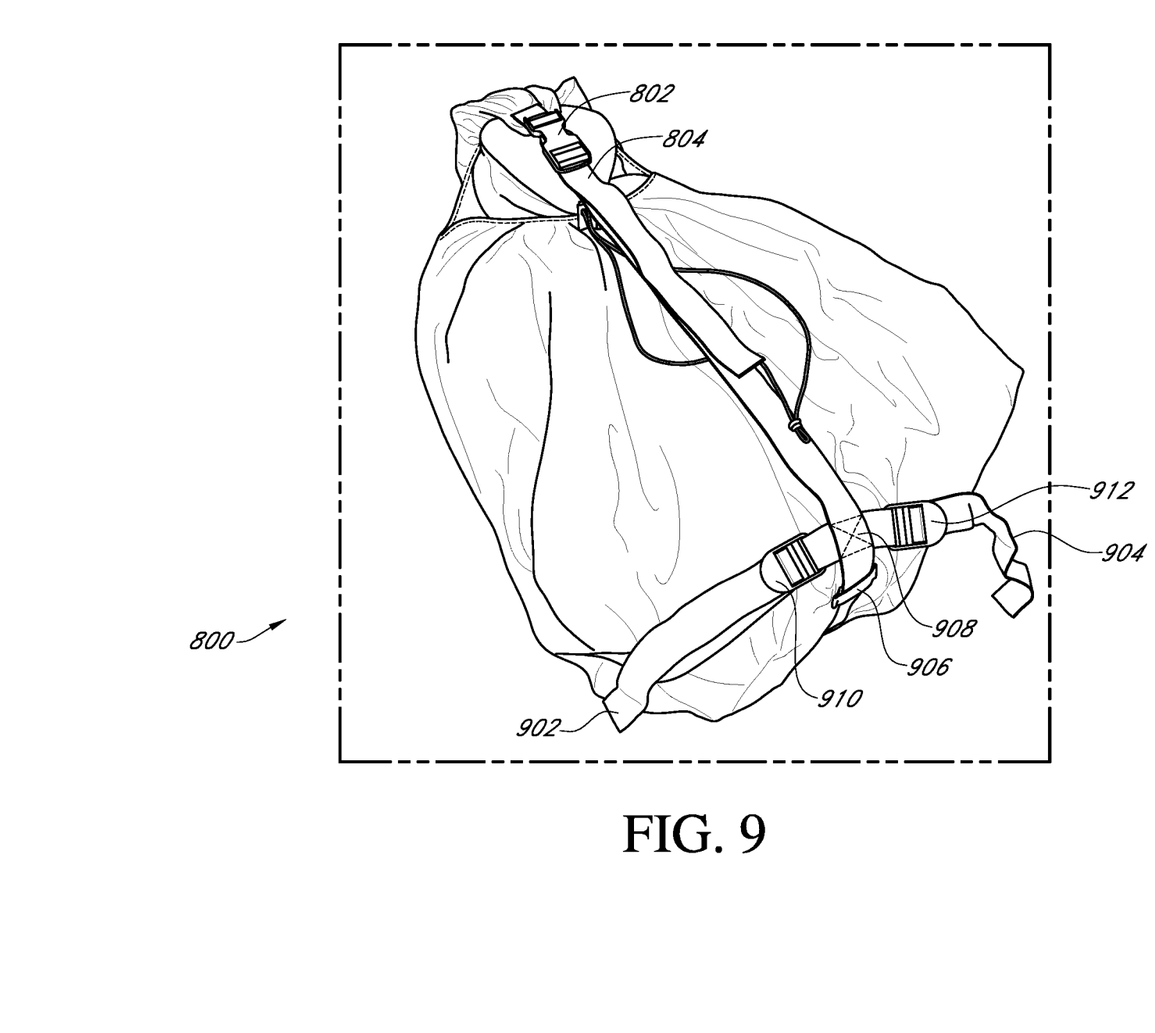
FIG. 9 is an illustration of big game cape and skull transportation system in use according to one of various embodiments.

In various embodiments, two side straps 902 904 may converge to a center strap 906 at a loop 908 sewn onto the flexible sheet 706 and adjust in length using connectors 910 912 to adjust a thickness of a 704 receiver in order to secure a skull and a cape of a big game animal. In various embodiments, the center strap 906 includes a corresponding connector 804 adapted to connect to a connector 802 attached to a hood 702 by a strap 806. In various embodiments, the length of the center strap 906 is adjustable to change the length of the cape or hide and skull transportation system 700 as depicted in FIGS. 7, 8, and 9.

In various embodiments, the cape receiver 104 704 may vary in size depending on the expected skull and hide size of the animal. In some embodiments, the cape receiver 104 704 may also vary in size depending on whether the entire animal hide or just a portion of the animal hide is being transported. In some embodiments, the cape receiver 104 704 may be manufactured in a first size and an extension sheet may be reversibly added to convert the cape receiver 104 704 into a second size by the end user. In some embodiments, the addition may be completed using buttons, a zipper, or any other connector means.

Referring to FIGS. 2, 7 and, 8, a depiction of a hood 102 702 is shown according to an embodiment. In various embodiments, the hood 102 702 may include a material 202 having an outwardly facing exterior surface 204 joined to an interior surface 206 by an opening perimeter 208 and the opening perimeter 208 may surround an opening 212 to a cavity 210. In various embodiments, the cavity 210 may be shaped to hold the muzzle or snout of an animal as part of a packing and transportation system for a cape and skull of big game animals for later taxidermy. In some embodiments, the exterior surface 204 may be water resistant. In various embodiments, an opening perimeter 708 may surround an opening 710 to larger cavity 718 that includes a cavity for an animal snout and a connected cavity for a skull and cape.

Figure 10:
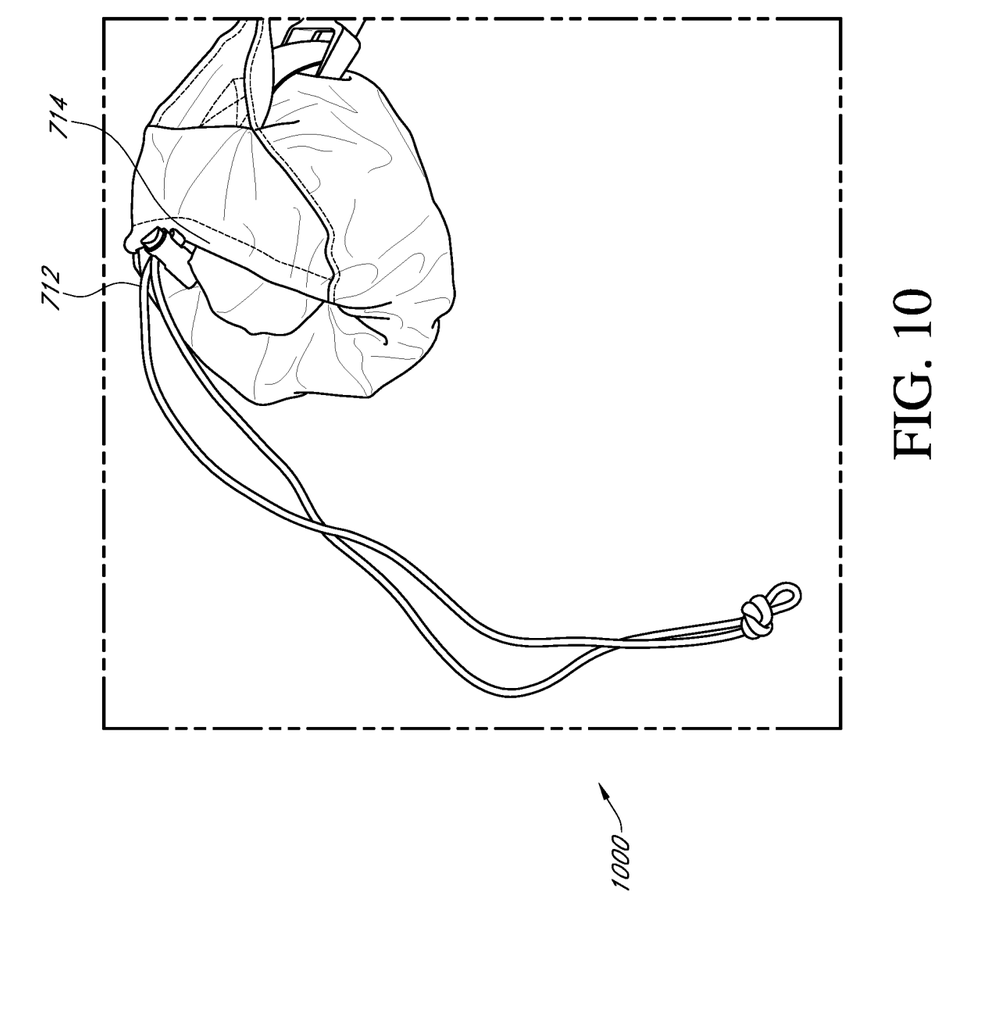
FIG. 10 is an illustration of a big game cape and skull transportation system in a stored configuration according to various embodiments.

Referring to FIG. 10, a draw string or cord 226 712 may be sewn into the material 202 at or near the opening perimeter 208 714 to constrict around the opening 212 710 after receiving the cape receiver 104 704 for periods when the cape and skull transportation system 100 1000 is not in use.

In various embodiments, a draw string or cord 712 may extend through an internal passageway 716 of a perimeter 708 to constrict around an opening 710 and thereby constricting the opening to the hood 702 and cape receiver 704. Referring to FIG. 7, a depiction of a cape or hide and skull transportation system 700 is shown in a configuration where the draw string or cord 712 is in an undrawn state according to an embodiment. Referring to FIGS. 8 and 9, a depiction of a cape or hide and skull transportation system 800 is shown in a configuration where a draw strong or cord 712 has been drawn to constrict an opening 710.

In various embodiments, the hood 102 may include a plurality of straps 214, 216, 218 with adjoining connectors 220, 222, 224 and the connectors 220, 222, 224 may be designed to interact with a corresponding set of connectors 152, 154, 156. In various embodiments the connectors 220, 222, 224, 152, 154, 156 may be cords, cables, or any elongated structure capable of connecting two objects. In some embodiments, the connectors 220, 222, 224 may be affixed directly to the hood 102. In some embodiments, the connectors 220, 222, 224 and corresponding connectors 152, 154, 156 may be marked in connecting pairs and in some embodiments may be color-coded. In some embodiments, the connectors 220, 222, 224 may be spaced apart along or near the opening perimeter 208. In some embodiments, the connectors 220, 222, 224 and straps 214, 216, 218 may be sewn onto the hood 102 material 202 or attached in any known and useful manner. In various embodiments, the connectors 220, 222, 224 may be spaced apart and/or the corresponding connectors may be spaced apart 152, 154, 156.

In various embodiments, the hood may further include a thin material 238 including an enclosed interior surface 234 forming a passageway 228 and an exterior surface 242 joined to the interior surface 234 along an opening perimeter 208. In various embodiments, a cord 226 may occupy the passageway 228 and the cord may have a first end 232 extending out of a first passageway opening 236 and a second end 230 extending out of a second passageway opening 240, wherein the passageway openings 236, 240 may be formed along the opening perimeter 208. In some embodiments, a cord lock 242 may secure the first and second ends 232, 230 of the cord 226. In various embodiments, the material may be fabric, plastic, or burlap.

Figure 3:
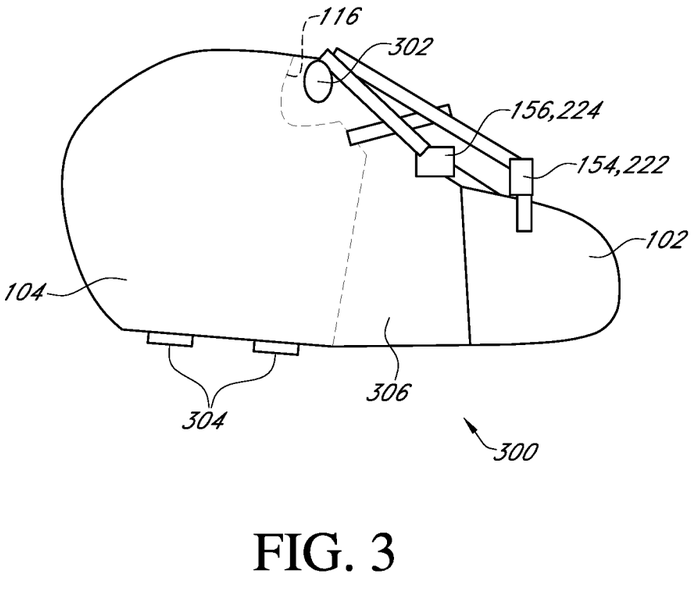
FIG. 3 is an illustration of big game cape and skull transportation system in use according to one of various embodiments.

Referring to FIG. 3, a depiction of a cape and skull transportation system 300 is shown in an in-use configuration according to an embodiment. In various embodiments, an animal cape may be folded into the cape receiver 104 which may then be secured to the hood 102 by actuating pairing connectors 154, 222, 156, 224. In various embodiments, the animal cape or hide may be rolled or folded into a position adjacent to the skull of the animal and the cape receiver 104 may then wrap around the cape and be secured to the hood 102 in a manner that may restrict movement of the animal cape and skull relative to one another. In some embodiments, the antlers or horns 302 may be in physical contact or abut the side edges 116, 140 or the concave edges 122, 134 in the in-use configuration. In some embodiments, the cape receiver 104 wraps or folds around an animal skull 306. In such a configuration, a big game animal shoulder and head regions can be preserved for later taxidermy.

In some embodiments, the cape and skull transportation system 300 may include mounts or a mounting system 304 to serve as attachment points for an external carrying system. In some embodiments, the carrying system may be a backpack, sled, all-terrain vehicle, or relate to some other mode of transportation.

Figure 4:
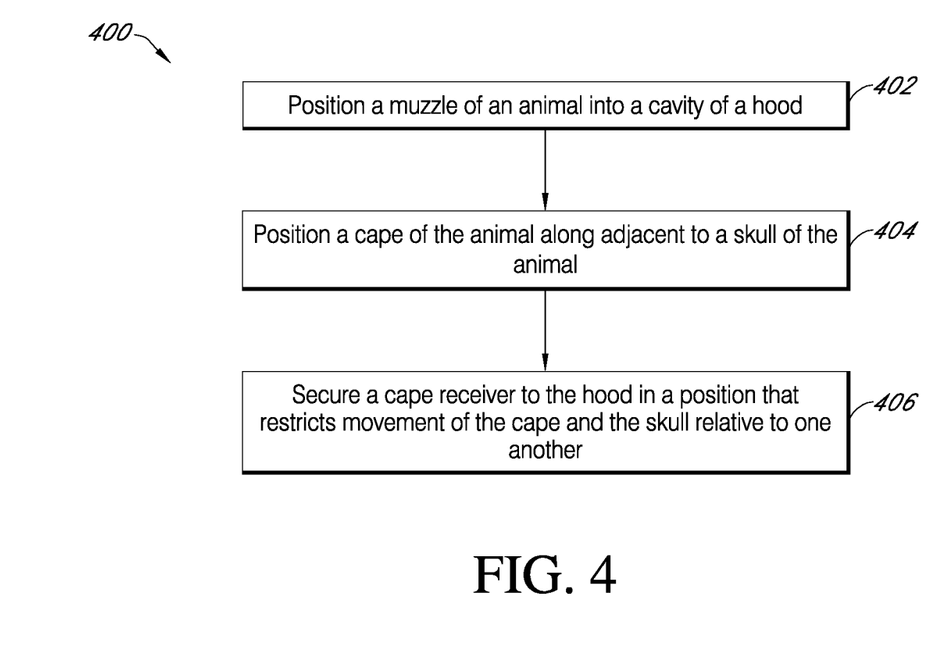
FIG. 4 is a flow diagram illustrating a method of use according to one of various embodiments.

FIG. 4 is an exemplary flowchart showing a method 400 of using a game animal cape and skull transportation system according to an embodiment. In step 402, a muzzle of an animal may be positioned within a cavity of a hood. In step 404, a cape of an animal may be position adjacent to the skull of the animal. In step 406, the cape receiver may be secured to the hood in a position that restricts movement of the cape and skull relative to one another.

In various embodiments, an additional step may include positioning animal horns or antlers adjacent to a first and a second side edges.

In various embodiments, the step of folding the cape into the cape receiver causes the side edges to come into physical contact with the horns or antlers.

In various embodiments, some additional steps may include, loosening a cord to widen an opening leading to the cavity within the hood and removing the cape receiver from the cavity.

In various embodiments, the hood may include a thin material comprising an enclosed interior surface forming a passageway and an exterior surface joined to an opening perimeter of the hood, wherein the cord occupies the passageway.

In various embodiments, an additional step may include attaching the transportation system to a carrying device.

In various embodiments, the step of securing may further include the steps of matching a plurality of color-coded connectors affixed to the hood to a corresponding set of connectors affixed to the cape receiver and securing the connectors to the matched corresponding connectors.

In various embodiments, the hood may include an outwardly facing exterior surface joined to an interior surface at a perimeter opening, wherein the interior surface surrounds the cavity.

In various embodiments, the cape receiver includes a flexible sheet material that is joined along the perimeter opening.

In various embodiments, an additional step may include securing further includes tightening a strap.

Figure 5:
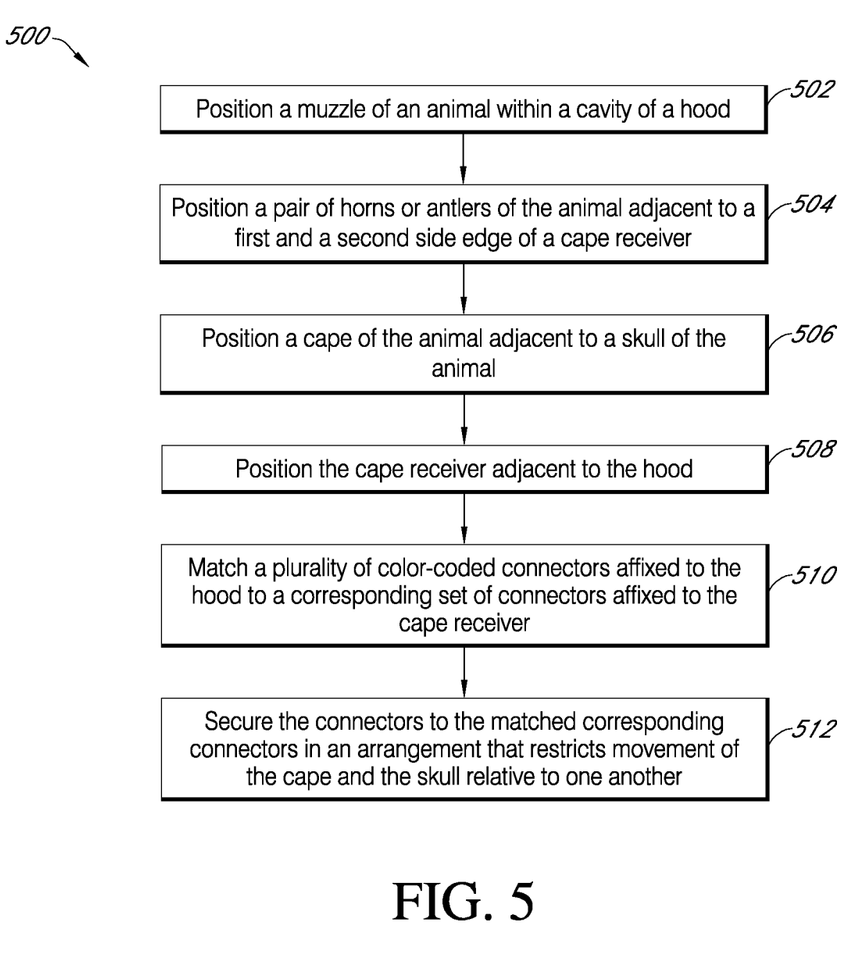
FIG. 5 is a flow diagram illustrating a method of use according to one of various embodiments.

FIG. 5 is an exemplary flowchart showing a method 500 of using a game animal cape and skull transportation system according to an embodiment. In step 502 a muzzle may be positioned within the cavity of a hood. In step 504, a pair of horns or antlers of the animal may be positioned adjacent to a first and a second side edge of a cape receiver. In step 506, a cape of the animal may be positioned adjacent to a skull of the animal. In step 508, the cape receiver may be positioned adjacent to the hood. In step 510, a plurality of color-coded connectors affixed to the hood may be matched to a corresponding set of connectors affixed to the cape receiver. In step 512, the connectors may be secured to the matched corresponding connectors in an arrangement that restricts movement of the cape and the skull relative to one another.

Figure 6:
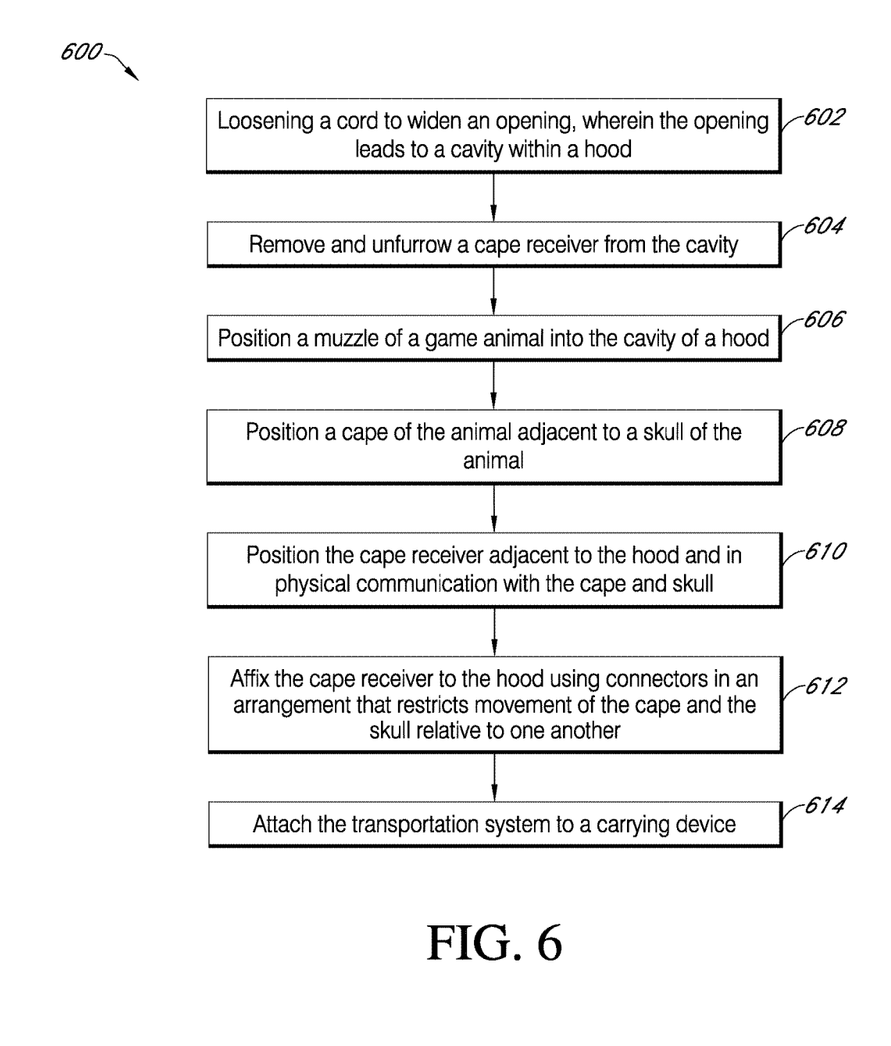
FIG. 6 is a flow diagram illustrating a method of use according to one of various embodiments.

FIG. 6 is an exemplary flowchart showing a method 600 of using a game animal cape and skull transportation system according to an embodiment. In step 602, a cord is loosened to widen an opening leading to a cavity within a hood. In step 604, a cape receiver may be removed and unfurrowed from the cavity. In step 606, a muzzle of a game animal may be positioned into the cavity of the hood. In step 608, a cape of the animal is positioned adjacent to a skull of the animal. In step 610, the cape receiver may be positioned adjacent to the hood and in physical communication with the cape and skull. In step 612, The cape receiver may be affixed to the hood using connectors in an arrangement that restricts movement of the cape and the skull relative to one another. In step 614, the transportation system may be attached to a carrying device.

While the present teachings are described in conjunction with various embodiments, it is not intended that the present teachings be limited to such embodiments. On the contrary, the present teachings encompass various alternatives, modifications, and equivalents, as will be appreciated by those skilled in the art.

What is claimed is:

1. An apparatus for packing and transporting a game animal cape and skull, comprising: a hood comprising: a first portion of a flexible sheet forming a predefined muzzle shape, wherein the predefined muzzle shape begins at a first end and connects to a second end by a compartment, wherein a cross-sectional area of the compartment decreases between the first end and the second end to create an enclosed cavity at the second end; a hood strap having a first end and a second end, wherein the first end is joined to a first portion of an outwardly facing exterior surface of the first portion of the flexible sheet and the second end includes a connector; the outwardly facing exterior surface is connected to a first portion of an interior surface at an opening perimeter, wherein the interior surface surrounds the enclosed cavity; a cape receiver, comprising: a second portion of the flexible sheet, wherein the second portion of the flexible sheet is joined to the first portion of the flexible sheet; a first side strap having a first end and a second end, wherein the first end is joined to the second portion of the outwardly facing exterior surface of the flexible sheet at a first position; a second side strap having a first end and a second end, wherein the first end is joined to the second portion of the outwardly facing exterior surface of the flexible sheet at a second position, wherein the first position is opposite to the second position; a center strap having a first end joined to the second portion of the outwardly facing exterior surface of the flexible sheet and a second end including a connector extending toward the hood, wherein the center strap is oriented perpendicular to the first and second straps and along a same axis as the hood strap, wherein the second end of the first strap and the second end of the second strap converge to a position on the center strap and are joined together, wherein the position is between the first end and the second end of the center strap, wherein the second portion of the outwardly facing exterior surface of the flexible sheet is connected to a first portion of the interior surface at the opening perimeter, wherein the opening perimeter is contiguous; and wherein the hood and cape receiver further include a thin material, comprising: an enclosed interior surface forming a passageway along the contiguous opening perimeter; and an exterior surface opposed to the enclosed interior surface, wherein the exterior surface of the thin material is joined to the contiguous opening perimeter.

2. The apparatus of claim 1, further comprising a cord occupying the passageway, wherein the cord has a first portion extending out of a first passageway opening and a second portion extending out of a second passageway opening, wherein the passageway openings are formed along the opening perimeter and are adjacent to one another.

3. The apparatus of claim 2, wherein a cord lock secures the first and second portions of the cord.

4. The apparatus of claim 3, further including a second cord lock.

5. The apparatus of claim 1, wherein the exterior surface of the hood is water resistant.

6. The apparatus of claim 1, wherein the connectors are marked so the user can identify the pairing connectors.

7. The apparatus of claim 6, wherein the connectors are marked using a color-coding system.

8. The apparatus of claim 1, wherein the cape receiver is made from an elastic material.

9. The apparatus of claim 1, further comprising a mount affixed to the flexible sheet.

10. The apparatus of claim 1, wherein the flexible sheet is shaped as a mirrored duplication along a centerline.

11. A pack bag for transporting at least a head portion of an antlered big-game animal, the pack bag comprising: a nose enclosure including a predefined muzzle shape, wherein the predefined muzzle shape begins at a first end and connects to a second end by a compartment, wherein a cross-sectional area of the compartment decreases between the first end and the second end to create an enclosed cavity at the second end, wherein the nose enclosure is sized and shaped to receive a nose-end portion of an antlered big-game animal head, wherein a first flexible sheet forms at least part of the nose enclosure; a second flexible sheet sized and shaped to wrap a caped portion attached to the antlered big-game animal head or be stowed in a folded or rolled configuration without wrapping the caped portion; and two or more straps connected to at least one of the first flexible sheet or the second flexible sheet such that, when fastened around the antlered big-game animal head, the one or more straps compress both the first flexible sheet and the second flexible sheet against the antlered big game animal head, wherein two of the two or more straps are in a perpendicular orientation relative to one another and interact functionally; and wherein the hood and cape receiver further include a thin material, comprising: an enclosed interior surface forming a passageway along the contiguous opening perimeter; and an exterior surface opposed to the enclosed interior surface, wherein the exterior surface of the thin material is joined to the contiguous opening perimeter.

12. The apparatus of claim 1, wherein the second end of the first strap and the second end of the second strap are sewn to the position on the center strap.

* * * * *